United States Patent [19]
Anthony et al.

[11] 3,762,270
[45] Oct. 2, 1973

[54] AUTOMATIC LOADER FOR INTERNAL GEARS

[75] Inventors: Russell W. Anthony, Harper Woods; Walter Frankiw, Grosse Pte. Park, both of Mich.

[73] Assignee: Lear Siegler, Inc., Santa Monica, Calif.

[22] Filed: Dec. 9, 1971

[21] Appl. No.: 206,404

[52] U.S. Cl............................ 90/1, 90/1.6, 214/1 Q
[51] Int. Cl............................................. B23f 23/04
[58] Field of Search .................... 214/1 Q; 90/1, 1.6, 90/1.4

[56] References Cited
UNITED STATES PATENTS
2,733,641   2/1956   Praeg......................................... 90/1
2,906,177   9/1959   Gates et al................................. 90/1

FOREIGN PATENTS OR APPLICATIONS
942,107   11/1963   Great Britain.......................... 90/1.6

Primary Examiner—Francis S. Husar
Attorney—Donald P. Bush

[57] ABSTRACT

In an automatic loader for loading internal gears into a machine, the internal gear is first pushed onto a gear-like shaving tool. If the teeth of the gear do not mesh with the teeth of the tool an automatic nudging device engages the outside diameter of the gear and simultaneously lifts and turns it until the teeth fall into mesh.

10 Claims, 2 Drawing Figures

PATENTED OCT 2 1973  3,762,270

AUTOMATIC LOADER FOR INTERNAL GEARS

BRIEF SUMMARY OF THE INVENTION

A machine intended to shave the teeth of an internal gear comprises a pot chuck adapted to support the internal gear with a gear-like finishing tool on the end of a stub shaft received within the internal gear and adapted to mesh therewith. Either the gear or the tool is positively driven in rotation and a relative reciprocation or traverse is provided between the gear and tool usually in a direction parallel to the axis of the gear.

In automatic production, the unfinished gears are brought in a carrier into a position adjacent the gear-like finishing tool while the tool is supported at the end of a horizontal stub arbor. The work gear is then ejected into a position in which it surrounds the tool and is suspended therefrom. Thereafter, the tool with the gear suspended therefrom is moved into the pot chuck which clamps the gear and initiates the next step in the gear finishing operation.

Equipment for automatically loading and unloading the machine comprises a transfer device having recesses at opposite sides, one of which is adapted to receive an unfinished gear at a loading station, and to transfer it to a position where the gear finishing tool awaits deposit of the gear thereon. The other side of the transfer device has a recess adapted to receive a finished gear when it is expelled from the chuck and to transport it to a position where it is ejected onto discharge rails or the like. Intermediate the recesses is a pusher device which when an unfinished gear is moved into the recess, moves in the transfer device so as to push a finished gear out of the transfer device onto the discharge rails. Similarly, movement of a finished gear into the last mentioned recess from the chuck of the machine operates the pusher to move an unfinished gear in the opposite recess into position on the gear finishing tool. Transfer and loading equipment of this type is illustrated in prior Gates U.S. Pat. No. 2,906,177.

It is found occasionally that when an unfinished gear is pushed onto the gear finishing tool, the teeth of the gear and tool do not come into mesh, in which case the work gear is suspended from the tool in a position above that in which it would be aligned with the chuck. Means are provided on the machine for sensing when this condition exists and operates a nudging device for simultaneously slightly lifting and turning the gear. If the gear does not fall into mesh at the first operation of the device, the device continues until meshing relationship is achieved.

DETAILED DESCRIPTION

Figures 1, 2:
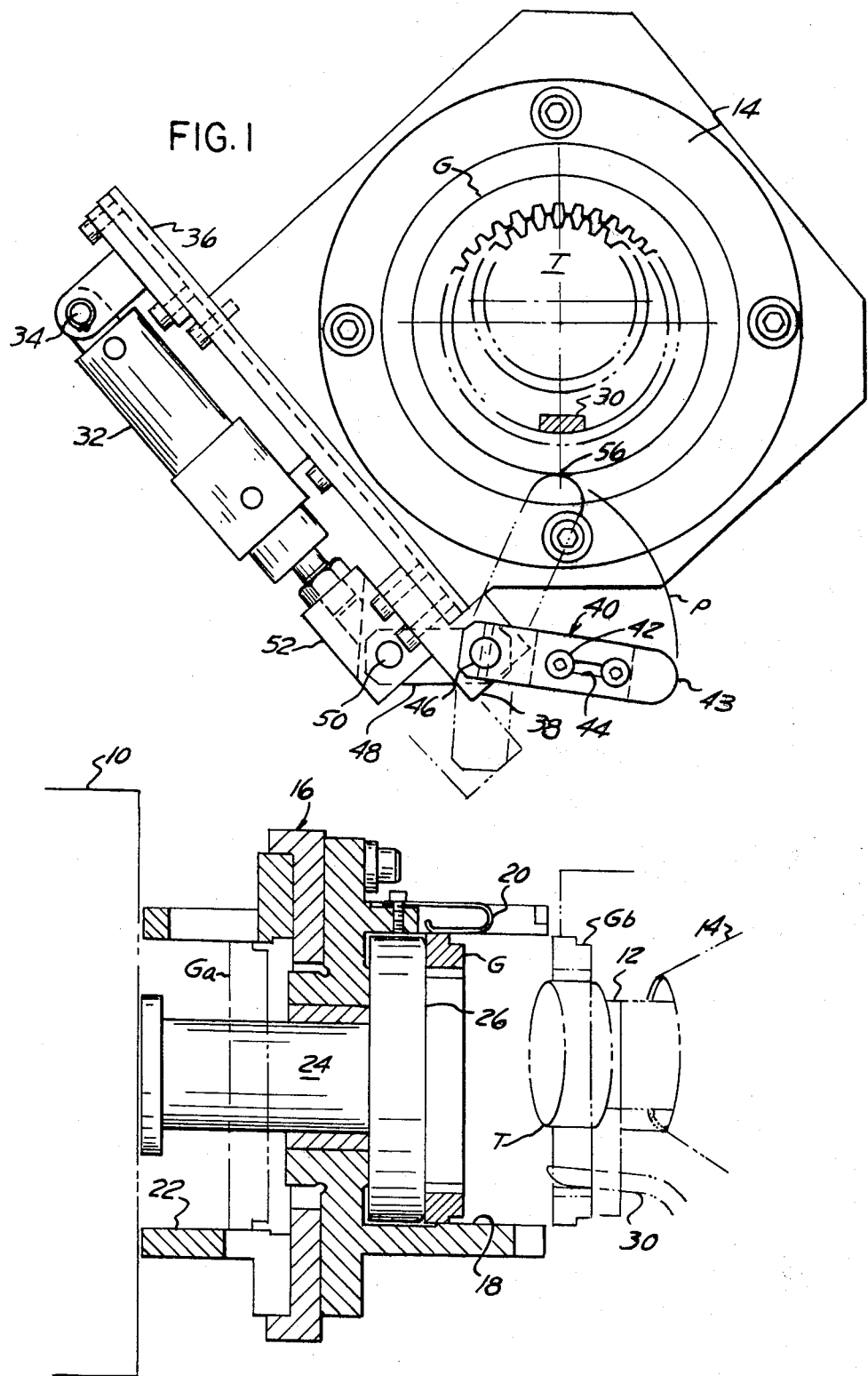
FIG. 1 is an end view of the tool support showing an internal gear suspended in meshing relation from the tool.
FIG. 2 is a side elevation partly in section, showing the relationship between the gear finishing tool and the gear transfer device.

The gear finishing machine includes a chuck the location of which is illustrated in broken lines at 10. Details of the chuck form no part of the present invention but it will be understood that an internally toothed work gear may be advanced into the chuck and there engaged by suitable clamping means for rotation during a gear finishing operation.

The gear finishing operation involves the use of a gear-like finishing tool T supported at the end of a stub arbor 12 on a tool support structure indicated generally at 14, which is movable to the right and left as seen in FIG. 2. The transfer carrier of the automatic loading equipment is indicated generally at 16 and comprises a recess 18 in which an unfinished work gear G is received, the gear being retained in the carrier by engagement with resilient means such as the leaf spring 20. The carrier 16 is provided with a second recess 22 for the reception of a finished gear, the location of such gear being shown at Ga in FIG. 2. Intermediate the recesses 18 and 22 is pusher structure comprising a shaft 24 having a head 26 at one end engageable with the unfinished gear G and a pusher bar 28 movable in the other recess 22 and engageable with the finished gear Ga.

It will be understood that the chuck 10 contains ejector mechanism which, when the gear finishing operation is complete, pushes the finished work gear out of the chuck and into the recess 22, the tool T having previously been withdrawn.

With the parts illustrated in FIG. 2, the carrier 16 is in position to receive the finished gear from the chuck 10 and carries the unfinished gear G in position to be moved onto the tool T. Ejection of the finished gear from the chuck causes the gear to engage the bar 28 and shifts the bar 28 and head 26 to the right, thus pushing the unfinished gear G into position onto the tool T, such position being indicated at Gb.

Thereafter, the transfer device 16 is shifted laterally from the position illustrated in FIG. 2, into position between an input chute and a discharge rail, at which point a second unfinished gear is pushed into the recess 18 to the position illustrated at G in FIG. 2, and the previously finished gear is pushed out of the recess 22 onto the discharge rails.

Associated with the tool support mechanism is a sensing finger 30 which is raised in the position shown in FIG. 1 where the gear G has failed to mesh with the tool T. This serves as a signal that the gear is not in properly meshed relation with the tool and hence, is supported above the position in which it is freely movable into the chuck 10.

Associated with the tool support structure indicated generally at 14, is an actuator 32 which may be an air cylinder or a solenoid, or the like, the actuator being pivoted as indicated at 34 to a bracket 36 mounted on the tool support structure. Pivoted to a second bracket 38 is a compound actuating arm 40 formed of two pieces and adapted to be clamped together at the required length by suitable clamping means indicated at 42 associated with slots 44 therein. The arm 40 has a rounded end 43 which is engageable with the cylindrical periphery of the gear G as indicated in the dotted line position of the structure. The arm 40 is connected to a pivot pin 46, located laterally from the vertical center line passing through the tool axis. The pin 46 carries an actuating arm 48, the arm in turn being pivotally connected as indicated at 50 with a head 52 movable by the actuator 32.

With the foregoing structure in mind the operation will now be described. With the parts in the position illustrated in FIG. 1 it will be observed that the gear G is suspended from the tool T but that because the teeth of the gear and tool are not in mesh, the gear is suspended with the crests of its teeth in contact with the crests of the teeth of the tool. Accordingly, the gear is suspended at a height approximately equal to the height of the teeth of the gear and tool.

Due to the fact that the gear G is suspended above the desired position, it will have engaged the sensing finger 30 which will initiate operation of the nudging device including the arm 40.

Preferably, the actuator 32 is air operated and suitable restriction means are incorporated so that movement of the arm 40 is at a relatively slow rate. In other words, the free end of the arm does not engage the outside diameter of the gear G with an impact, but instead moves smoothly into contact with it and thereafter effects a lifting and turning action.

As seen in FIG. 1, the rounded end 43 of the arm 40 moves along the curved path indicated at P. The location of the pivot mounting 46 is substantially below the normal location of the gear G and somewhat to the left of the vertical center line as shown. In this Figure, the approximate point of initial contact between the rounded end 43 of the arm 40 and the smooth cylindrical outer surface of the gear G is at the point 56, or approximately on the vertical center line passing through the gear and tool.

As the arm 40 moves in a counterclockwise direction from the position illustrated in FIG. 1, the gear G is lifted slightly to introduce clearance between the crests of the teeth of the tool and gear. At the same time, the engagement between the rounded end 43 of the arm and the gear tends to rotate the gear slightly counterclockwise to a position in which the crests of the teeth of the gear come into registration with tooth spaces on the tool T. At this time, except for the fact that the gear is supported from below by the nudging arm 40, the gear would be permitted to drop into full mesh and move vertically downwardly into alignment with the chuck. Instead, however, it moves downwardly only sufficiently to introduce the crests of the teeth slightly into the outer portion of the tooth spaces of the tool and thereafter, the gear will assume a position determined by the instantaneous position of the arm 40 and engagement between the teeth of the gear and tool. As the arm 40 is swung clockwise to the full line position illustrated in FIG. 1, it releases the gear which then moves downwardly into the fully meshed position in alignement with the chuck.

In initial setup for a particular size gear, the length of the arm 40 may be adjusted as previously described, so as to produce the required nudging effect characterized by simultaneous lifting and turning of the work gear.

What we claim as our invention is:

1. A gear loader in which an internal work gear is deposited on a gear-like tool having its axis horizontal to be suspended therefrom in meshed relation, first means responsive to the position of the gear to sense failure to mesh with the tool, and second means controlled by the position responsive means to slightly lift and turn the gear and release it for movement into fully meshed relation with the tool.

2. A gear loader as defined in claim 1 in which said second means comprises an arm, a pivot support mounting said arm in position such that on pivotal movement thereof, the free end of said arm engages the underside of the gear adjacent its lowermost surface element.

3. A gear loader as defined in claim 2 in which movement of the end of the arm is in an arcuate path just slightly intersecting the circle defined by the outside surface of a work gear suspended from the tool with the teeth thereof engaged crest-to-crest.

4. A gear loader as defined in claim 3, said arm being formed of longitudinally adjustable elements to accommodate the arm for use with gears of different size.

5. A gear loader as defined in claim 3 in which said second means comprises an actuator pivotally supported adjacent the tool, and a second arm fixedly secured to the first mentioned arm and pivotally connected to said actuator.

6. A gear loader as defined in claim 3 in which movement of said arm in gear engaging direction is about an axis located slightly laterally from the vertical center line of the tool, and movement of the arm is limited to a position just short of a vertical position above its pivot support.

7. A gear loader comprising a work support chuck, a tool carrier having a horizontal tool support spindle, a gear-like tool on said spindle, means for moving the tool carrier toward and away from the chuck to move an internal gear suspended in meshed relation from the gear-like tool into said chuck, a work transfer carrier having opposed recesses therein for receiving work gears, said transfer carrier being movable into position such that an unfinished work gear ejected therefrom is deposited onto the gear-like tool, means operated by movement of a finished work gear from said chuck into one recess of said transfer carrier to move an unfinished gear out of the other recess and to deposit it on the tool, and means responsive to the position of the gear on said tool operable to slightly lift and turn the gear and to release it for movement into fully meshed relation with the tool.

8. A gear loader as defined in claim 7 in which said last named means comprises a finger engaged by a work gear suspended from but not fully meshed with the tool, and a pivoted arm having a pivot mounting below and slightly spaced laterally from a vertical center line of the tool, and having a free end movable past the lower surface of the gear in slightly overlapping relation with respect thereto, and means controlled by said finger for swinging said arm to a position just slightly beyond the bottom element of the gear as determined by the vertical center line therethrough.

9. A gear loader as defined in claim 8 in which the limiting position of said arm is slightly beyond the vertical center line of the tool but slightly short of the vertical center line of the pivot mounting of the arm.

10. An internal gear finishing machine comprising a chuck for receiving and rotatably supporting an internal gear, a loader comprising a movable tool support for a gear-like tool on which the work gear is suspended prior to movement thereof to insert the gear into the chuck, means on the loader responsive to position of the gear prior to movement of the tool support to insert the gear into the chuck to sense failure of the gear to mesh with the tool, and means responsive to the first mentioned means to slightly turn the gear while it is suspended on the tool and to release it for movement into fully meshed relation with the tool.

* * * * *